(12) United States Patent
Newkome et al.

(10) Patent No.: US 6,399,717 B1
(45) Date of Patent: Jun. 4, 2002

(54) DENDRITIC MATERIALS FOR ENHANCED PERFORMANCE OF ENERGY STORAGE DEVICES

(75) Inventors: George R. Newkome, Apollo Beach; Charles N. Moorefield, Tampa, both of FL (US)

(73) Assignee: The University of South Florida, Tampa, FL (US)

( * ) Notice: Subject to any disclaimer, the term of this patent is extended or adjusted under 35 U.S.C. 154(b) by 0 days.

(21) Appl. No.: 09/646,737

(22) PCT Filed: Mar. 26, 1999

(86) PCT No.: PCT/US99/06706

§ 371 (c)(1),
(2), (4) Date: Nov. 22, 2000

(87) PCT Pub. No.: WO99/48950

PCT Pub. Date: Sep. 30, 1999

Related U.S. Application Data

(60) Provisional application No. 60/079,413, filed on Mar. 26, 1998.

(51) Int. Cl.[7] ............................. B32B 5/14; C08G 69/00; C08G 69/26

(52) U.S. Cl. ...................... 525/451; 428/310; 428/328; 428/332; 428/363; 428/391; 428/423; 428/424; 428/451

(58) Field of Search .......................... 525/451; 428/310, 428/328, 332, 363, 391, 423, 424, 451

(56) References Cited

U.S. PATENT DOCUMENTS

| | | | | | |
|---|---|---|---|---|---|
| 4,435,548 | A | * | 3/1984 | Tomalia et al. | 525/451 |
| 4,507,466 | A | * | 3/1985 | Tomalia et al. | 424/DIG. 16 |
| 4,568,737 | A | * | 2/1986 | Tomalia et al. | 424/DIG. 16 |
| 4,631,337 | A | * | 12/1986 | Tomalia et al. | 210/735 |
| 4,694,064 | A | * | 9/1987 | Tomalia et al. | 424/DIG. 16 |
| 4,737,550 | A | * | 4/1988 | Tomalia | 525/418 |

\* cited by examiner

*Primary Examiner*—Bernard Lipman
(74) *Attorney, Agent, or Firm*—Kohn & Associates

(57) ABSTRACT

There is provided dendritic materials for enhanced performance of an energy storage device having a unimolecular micelle including branched building blocks. Also provided is an energy storage device having a lithium source, a hydrocarbon dendrimer based electrolyte made up of a unimolecular micelle including branched building blocks, insertional electrode, and a current conductor.

22 Claims, 14 Drawing Sheets

*Fig-3A*
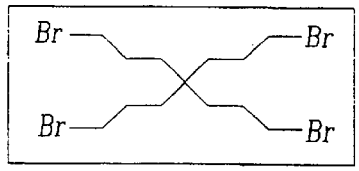
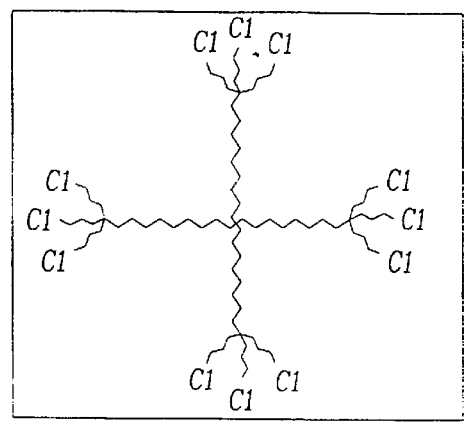
*Fig-3B*
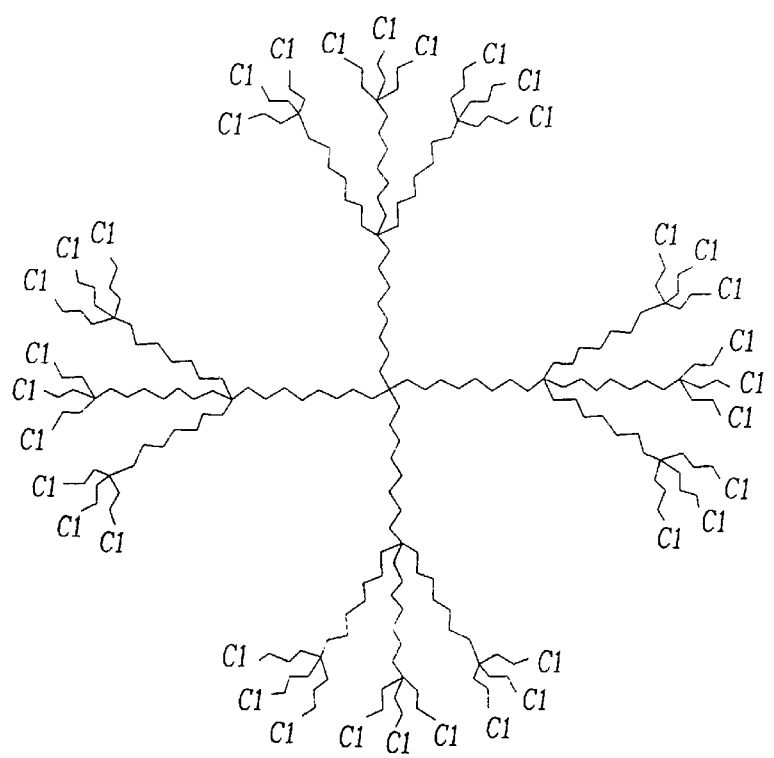
*Fig-3C*

POSITIONING OF TEMPLATED ENERGY 'SINKS' AND 'SOURCES'

GUESTS CAN EFFECT TERMINAL GROUP ROTATION AND POSITION INTERNAL AND EXTERNAL UNITS

COMBINATORIALLY PREPARED DENDRIMER WITH A DYNAMIC SURFACE

SURFACE DOMAIN OF GROUPS WITHIN
A CONICAL REGION MAPPED BY ROTATION
AT A MAJOR BRANCH JUNCTURE

Fig-5A₁

'SEPARATED'
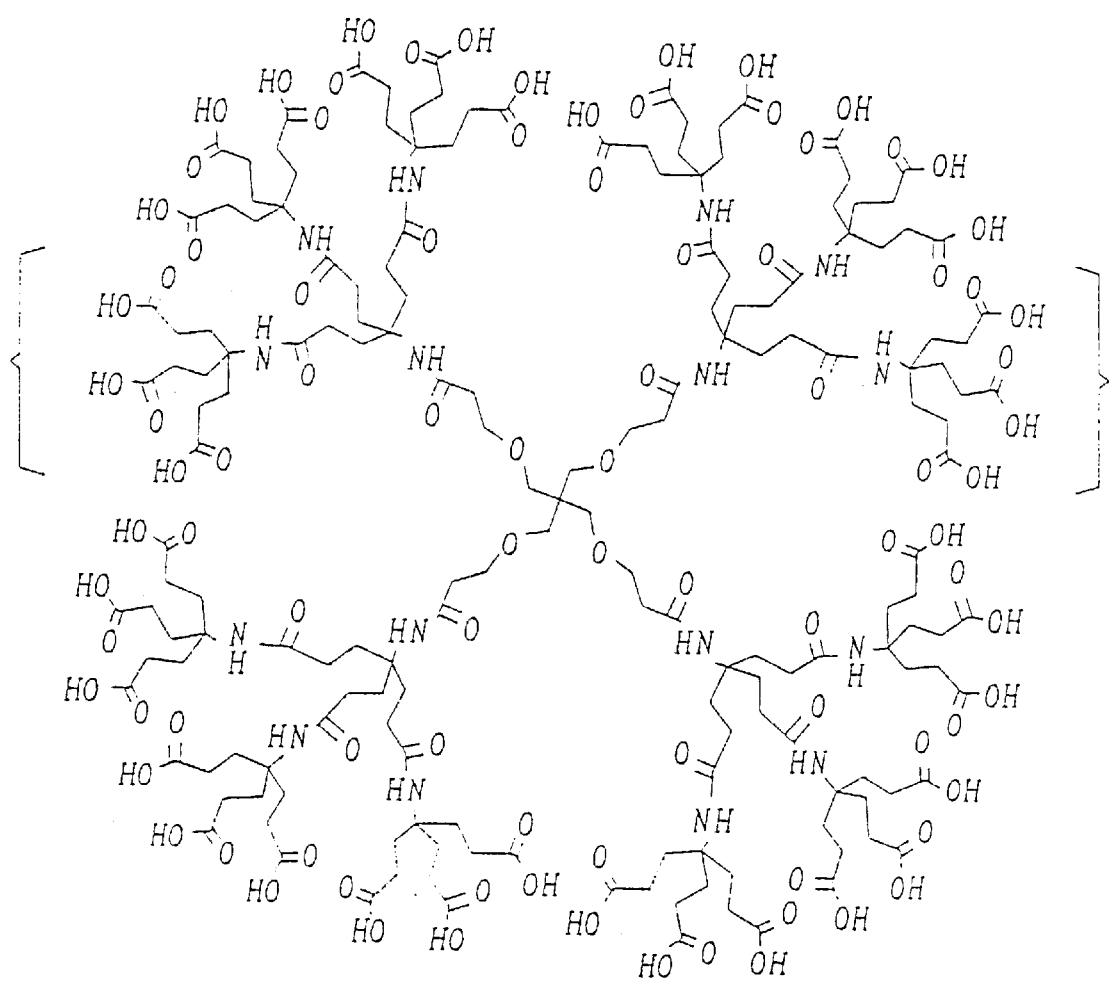
Fig-5A₂

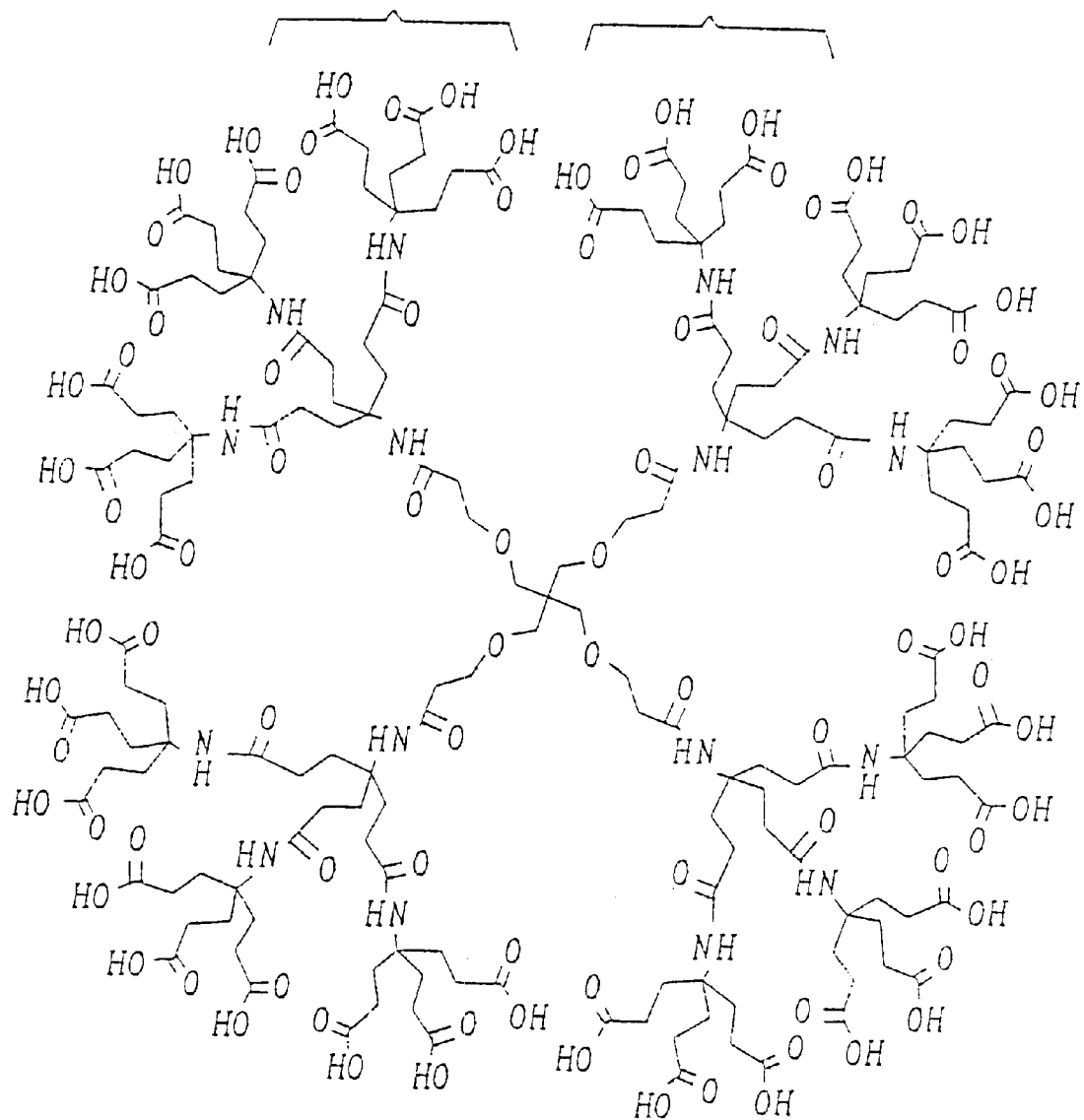
Fig-5A₃

*Fig-6A*
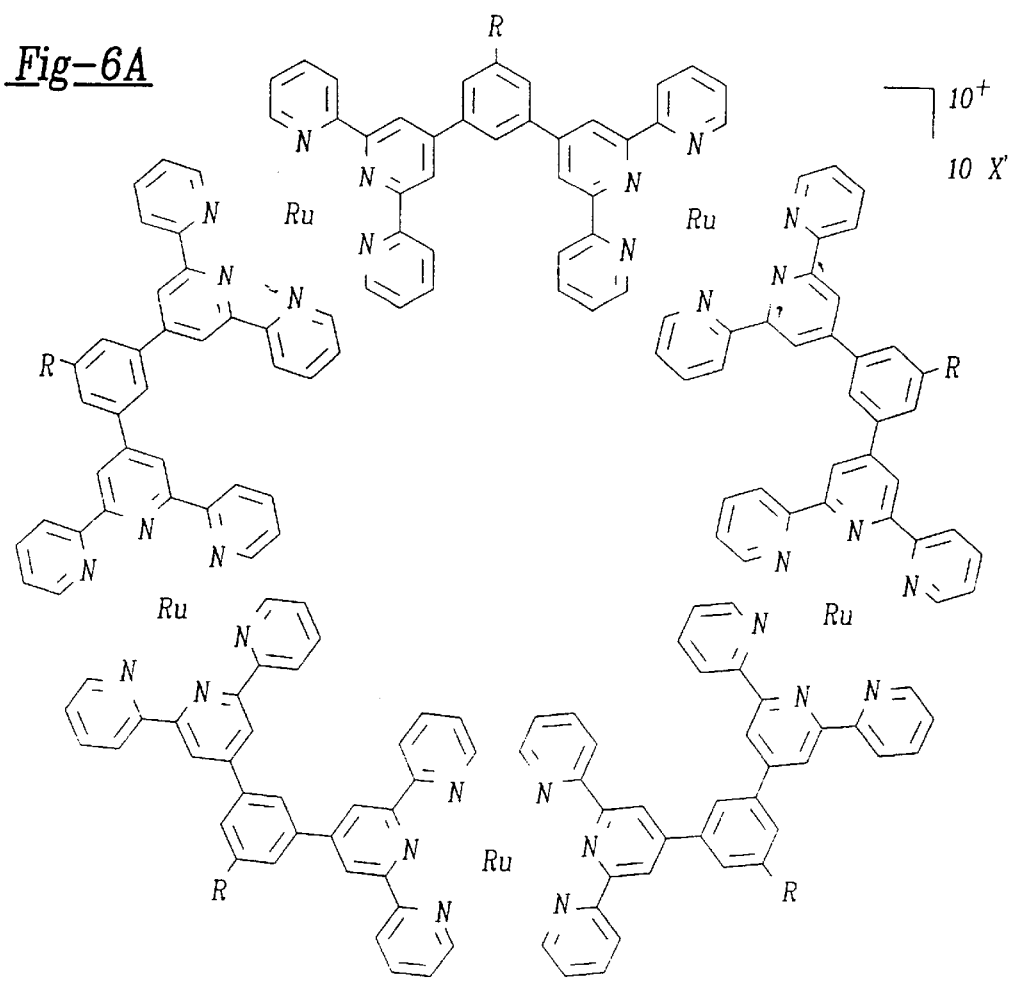
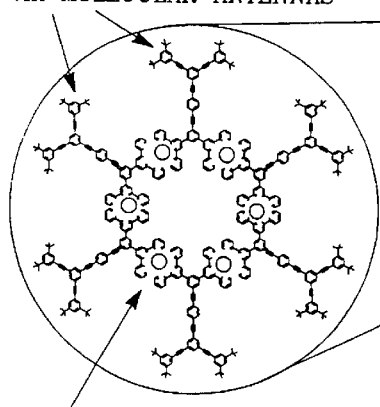
ENERGY COLLECTION VIA MOLECULAR ANTENNAS
TRANSITION METAL-BASED ENERGY SINK
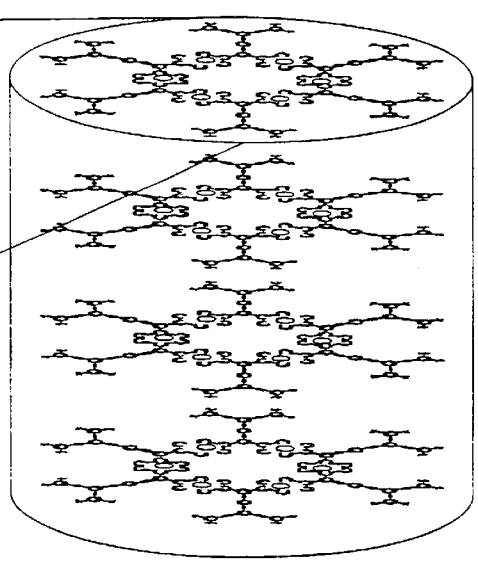
STACKED COLUMNAR MESOPHASE FOR ENERGY STORAGE
*Fig-6D*

SCHEME 2. DIRECTED SYNTHESIS OF A HEXA-Ru(II) CLUSTER.

DENDRITIC MATERIALS FOR ENHANCED PERFORMANCE OF ENERGY STORAGE DEVICES

CROSSREFERENCE TO RELATED APPLICATIONS

This Application is a conversion of U.S. Ser. No. 60/079,413, filed Mar. 26, 1998, which is incorporated herein by reference.

BACKGROUND OF THE INVENTION

1. Field of the Invention

The present invention relates to dendritic materials for use in energy storage devices. More specifically, the present invention relates to unimolecular micelles acts as a multi-component assembly wherein the independent micelles act in concert to form an enhanced energy storage device.

2. Description of Related Art

Neat and orderly arrays for micellar systems have been reported, and are structurally based on the original work of vögtle et al., who delineated "cascade" construction. The U.S. Pat. No. 4,435,548, issued Mar. 6, 1984; U.S. Pat. No. 4,507,466, issued Mar. 26, 1985; U.S. Pat. No. 4,558,120, issued Dec. 10, 1985; U.S. Pat. No. 4,568,737, issued Feb. 4, 1986; U.S. Pat No. 4,587,329, issued May 6, 1986; U.S. Pat. No. 4,631,337, issued Dec. 23, 1986; U.S. Pat. No. 4,694,064, issued Sep. 15, 1987; and U.S. Pat. No. 4,737,550, issued Apr. 12, 1988, all to Tomalia et al., relate to branched polyamidoamines. The polyamidoamines include a plurality of pendent aminoamide moieties exhibiting properties which are related to linear polyamidoamines from which the branched polymers are derived. These compounds can be characterized as high molecular weight, highly-branched, multi-functional molecules possessing a three-dimensional morphology. Synthetic strategies employed for the realization of such "cascade polymers" require consideration of diverse factors including the content of the initial core, building blocks, space for molecules, branching numbers, dense packing limits, and desired porosity, as well as other factors. The selection of the building blocks govern the type of branching desired from the core molecule, as well as the technology used to attach each successive layer or "tier" of the cascade polymer.

Applicants have developed methods of making cascade polymers, especially those providing a unimolecular micelle consisting essentially of alkyl carbon possessing diverse terminal functionality. Such compounds and methods are disclosed in U.S. Pat. No. 5,154,853 (1992); U.S. Pat. No. 5,136,069 (1992); U.S. Pat. No. 5,773,551 (1998), all to applicants.

Further developments of the above-described chemistry by applicants have demonstrated that the unimolecular micellar character permits the initial evaluation of the orderliness and chemistry within a series of specifically designed, spherical macromolecules due to covalently bound assemblies of internal reactive sites. Similar dendritic species have been constructed with amide, ethereal, phosphonium, silicone, germane, and aryl, inner linkages and functionalities.

Iterative synthetic methodology has afforded new pathways to the construction of complex, high molecular weight molecules. A notable and tangible consequence of iterative chemistry can be seen in the rapid emergence, and intense scrutiny, of branched macromolecules known as dendrimers. (Newkome, et al. 1996). The realization of "dendrimers," and related constructs such as "hyperbranched" (Turner, 1995) and "dendrigraft" (Tomalia, et al., 1997; Grubbs, et al., 1997) polymers, has facilitated advances in the potential to design and build architecturally homogeneous branched molecular assemblies. However, there are inherent limitations imposed on these structures due primarily to 1) the repetitive application of a single building block for tier construction leading to functional group uniformity on the surface as well as the interior of the branched structure; and 2) a lack of interchangeable monomers that would facilitate the incorporation of diverse application oriented functionality and thus allow the creation of utilitarian assemblies.

It would therefore be useful to have structures which utilize multiple building blocks and were able to also utilize interchangeable monomers thus allowing the creation of utilitarian assemblies.

The present invention addresses these limitations via 1) the development of a "modular" set of application-oriented, branched building blocks for dendritic synthesis (Young, et al., 1994) aimed directly at enhanced solid-state energy storage and release devices, e.g., lithium battery performance; and 2) the use of combinatorial-based tier construction techniques (Newkome, et al., 1998) for the creation of unimolecular, multi-component assemblies whereby the individual components can act in concert to produce a desired physiochemical effect.

SUMMARY OF THE INVENTION

According to the present invention, there is provided dendritic materials for enhanced performance of an energy storage device having a unimolecular micelle including branched building blocks. Also provided is an energy storage device having a lithium source, a hydrocarbon dendrimer based electrolyte made up of a unimolecular micelle including branched building blocks, insertional electrode and a current conductor.

DESCRIPTION OF THE DRAWINGS

Other advantages of the present invention will be readily appreciated as the same becomes better understood by reference to the following detailed description when considered in connection with the accompanying drawings wherein.

DETAILED DESCRIPTION OF THE INVENTION

Generally, the present invention provides dendritic materials for enhanced performance of energy storage devices which include a unimolecular micelle containing branched building blocks, and the method of making the same.

Figure 1:
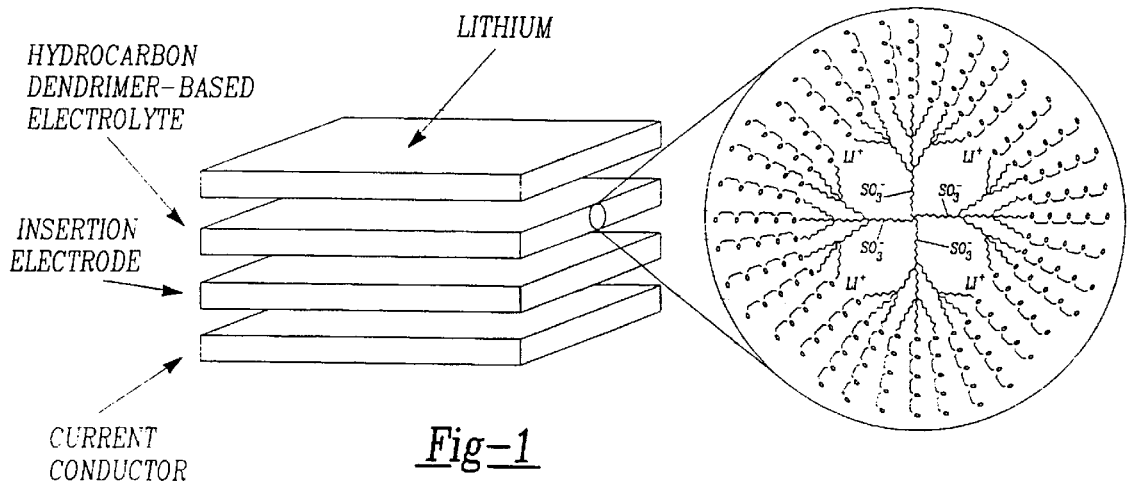
FIG. 1 shows an exploded view of a proposed battery using highly stable, polyethylene glycol-terminated saturated hydrocarbon dendrimers as the electrolyte matrix.

Specifically, advancement in lithium- and lithium rocking chair-battery efficiency (Lipkowski, et al., 1994; Owen, 1997) is expected to result from 1) improved electrolyte materials based on highly stable, polyethylene glycol functionalized, saturated hydrocarbon-type dendrimers, and 2) significantly reduced inter-electrode separations (FIG. 1).

Ultimately, the present invention provides branched assemblies possessing mutually compatible and synergistic units capable of triggered electrochemical discharge. This forms the basis of a logical evolution of iterative chemistry that melds the maturity of classical polymer, organic, and inorganic chemistries, as well as emerging fields that include "$C_{60}$" technology, with the strengths of dendritic chemistry.

Notable focus of the present invention is markedly similar to the desirable characteristics (i.e., stability and reproducibility) of "nanoelectronic structures." According to V. A. Bykov (Bykov, et al., 1994):

1) "Chemical bond systems need to be completely saturated." (Applicants have developed [Newkome, et al., 1991] and patented [Newkome, et al., 1992] the only full saturated hydrocarbon branched architecture to date.);

2) "Composition of nanometer elements with the same function should be absolutely identical to each other." (This is a primary goal of iterative synthetic chemistry upon which the present invention relies.);

3) "Nanometer element production technology necessitates self-organization technology." (Iterative synthetic chemistry and the resulting architectures are inherently concerned with organization of elements and units based both on covalent and non-covalent means.)

"To satisfy these requirements, nanometer elements must be molecules."

Figure 2A:
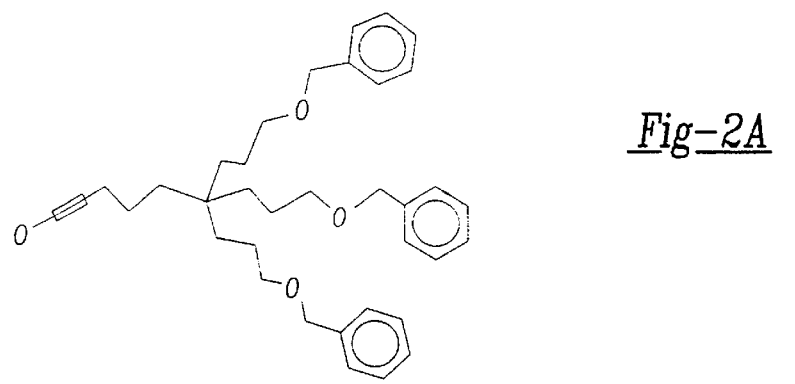
FIG. 2 shows the utilitarian dendritic building blocks.
Figure 2B:
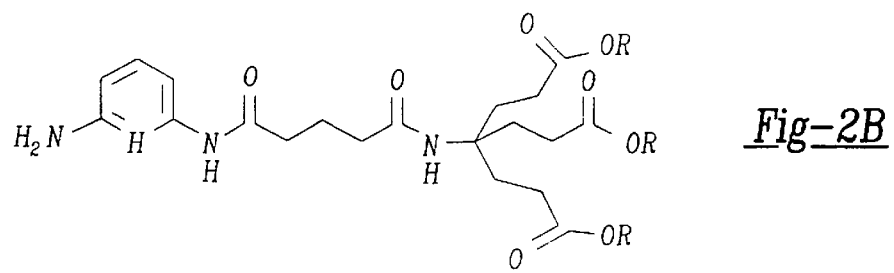
Figures 2C, 2D, 2E:
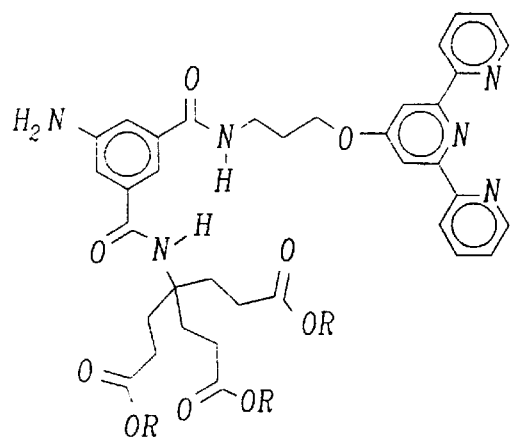
Figure 3D:
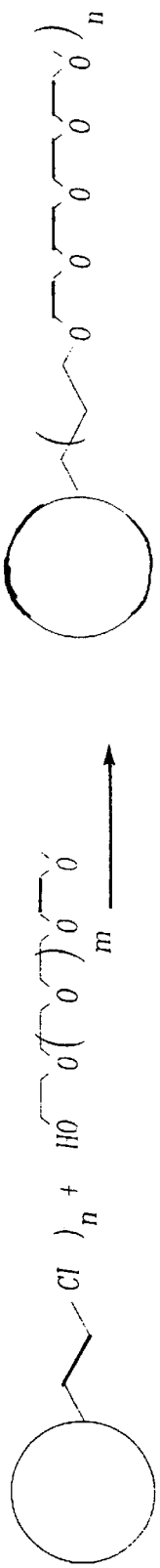
FIG. 3 shows the construction of PEG-terminated saturated hydrocarbon dendrimers and some easily accessible PEG-based building blocks.

To date, the present invention has evolved from a diverse set of branched monomers. FIG. 2 depicts a few of the recently developed utilitarian building blocks (1–7). Monoalkyne monomer 1 was developed for the creation of a highly stable "unimolecular micelle" (Newkome, et al., 1991) which was shown to facilitate the aqueous solubilization of a variety of water insoluble materials. Building blocks 2–4 demonstrated the incorporation of molecular recognition (Newkome, et al., 1996) sites as well as metal (Newkome, et al., 1995; Newkome, et al., 1993; Newkome, et al., 1997) and non-metal (Newkome, et al., 1997) electroactive centers, respectively, into a dendritic superstructure. Isocyanate monomers (Newkome, et al., 1998; Newkome, et al., 1997; Newkome, et al., 1997) 5–7 were recently developed to investigate the rapid preparation of heterogeneous and asymmetric architectures via the "combinatorial-based" use of mixtures of these and similar isocyanate building blocks for dendrimer construction (Newkome, et al., 1998).

In its simplest embodiment, the dendritic polymer-based electrolyte materials (FIG. 3) are predicated primarily on the use of the patented process for the construction of all-saturated hydrocarbon dendrimers (Newkome, et al., 1992) (i.e., 9 and 10 that are prepared from monomers 1 and 8) and the attachment of polyethylene glycol(Craven, et al., 1986) units on the dendrimer surface.

Polyethylene glycol (PEG) units can be easily attached to dendrimers and building blocks via the well established Williamson synthesis (Craven, et al., 1987) to afford PEG-modified dendrimers (Newkome, et al., 1992). Initially, the use of these materials in concert with added "free" salts (Owen, 1997) [e.g., $LiClO_1$, $LiCF_3SO_2$, $LiPF_6$, $LiN(SO_2CF_3)_2$, and $LiC(SO_2CF_3)_3$] is accomplished. Incorporation of PEG units of any desired length can be achieved via preparation of functionalized building blocks such as 12 and 13 while anion "immobilization" (Newkome, et al., 1997) is effected by the preparation of multi-group monomers such as 14. Immobilization within the internal regions has the added advantage of effectively 'hiding' the anion from a reactive electrode surface.

Improved electrolyte stability, more efficient Li-ion transport, and decreased electrolyte layer thickness results in greater specific energy, energy density, and battery cycle life. (Owen, 1997). Specific present pitfalls addressed by this technology are (a) stability towards highly oxidizing and reducing environments [i.e., at the anode and cathode interfaces due to the absence of reactive functional groups such as NH, OH, CONH, etc.] (b) electrolyte crystallinity and brittleness [i.e., such as found with LiI and some other polymeric matrices] ; (c) mechanical strength; (d) charge and discharge temperature range operation; (e) electrolyte layer thickness [interelectrode gaps corresponding to ~$10^{-8}$ to $10^{-9}$ m are envisioned assuming a dendrimer radius of 20–25 Å]; (f) lithium plating ['dendrite' formation should be reduced in a more electrochemically stable electrolyte region]; and (g) safety [environmental as well as operational].

The present invention provides improved electrolyte stability by use of the dendrimers of the present invention and the method of their construction. The present invention provides amide based and urea based and carbamate-based methods of building block connectivity which are very stable to highly oxidizing and reducing conditions. The ultimate in stability is obtained from the use of the all hydrocarbon-based (unimolecullar micelle) dendrimer frameworks of the present invention.

Electrolyte layer thickness is decreased in accordance with the present invention because essentially one can make a layer that is one dendrimer thick by coating or applying a monolayer of the dendritic electrolyte material. Due to the iterative nature of the synthesis of the present invention, as layers are added either homogenously or combinatorially, thickness is absolutely controlled, as is architecture.

Lithium ion transport is facilitated by (a) the site specific incorporation of lithium coordination regions such as the polyethylene glycol units discussed above and charged counter ions; (b) the regularity of dendritic structures which has been well documented; and (c) the regularity of dendritic packing. This packing occurs much the way that spheres pack on a surface and then layer themselves during the stacking of additional layers.

Figure 4:
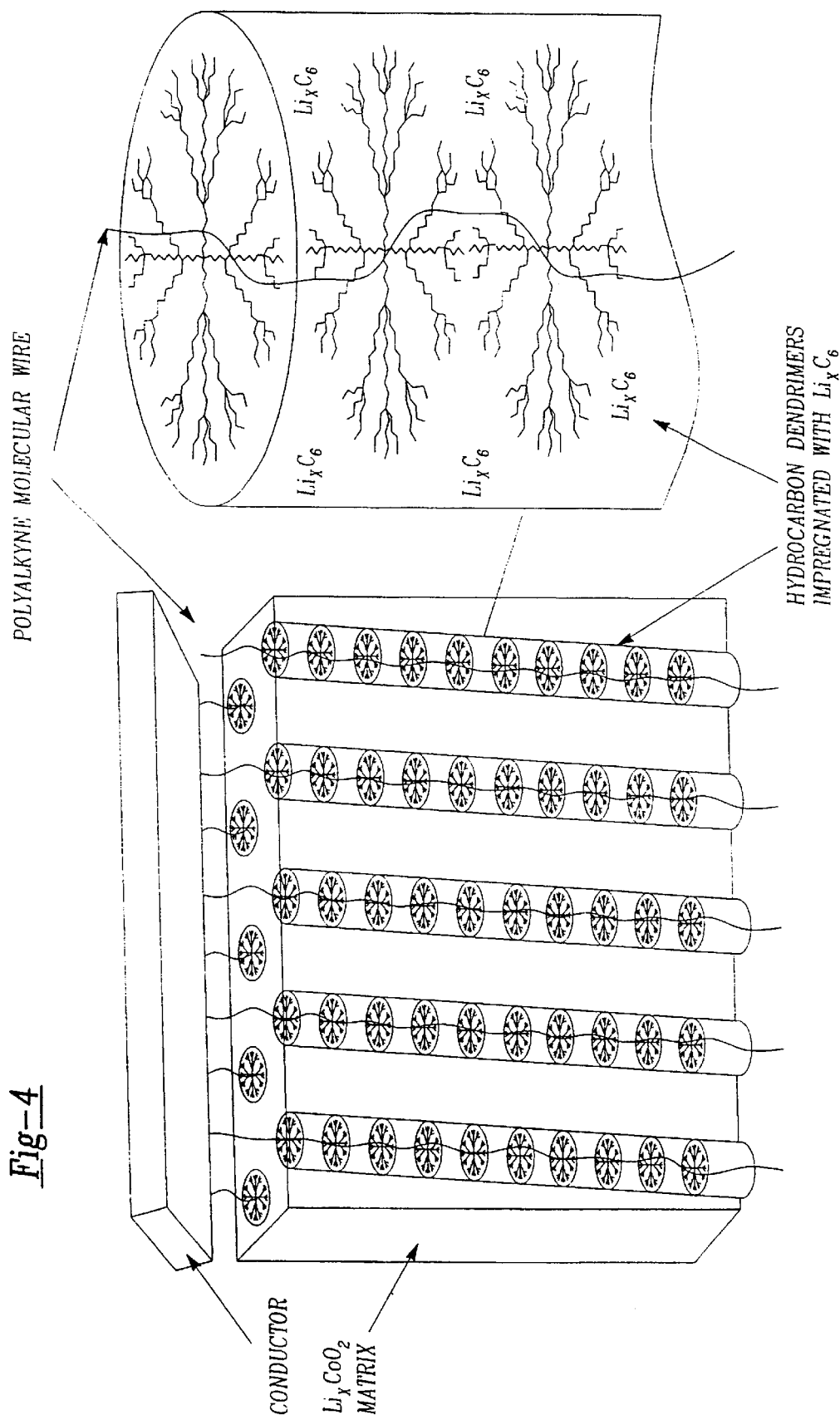
FIG. 4 shows the theoretical energy storage device using graphite impregnated hydrocarbon dendrimers connected via molecular wires and encased within an electrode/electrolyte matrix.

Exploitation of saturated hydrocarbon dendrimers for electrolyte construction includes linearly positioned macromolecular arrays grown on polyalkyne-based "molecular wires." FIG. 4 shows an energy storage device based on the encapsulation (Newkome, et al., 1991) of graphite ($LiC_6$) within the lipophilic regions of these hydrocarbon-coated wires which are implanted within a composite electrode ($LiCoO_2$). This design will facilitate new electrode-electrode designs and architecture in solid state devices. It is a combination of the chemistry developed by the inventors of the present invention with molecular wires on conjugated sites of unsaturation.

While intra- and inter-molecular "multiple structural element positioning" is in its infancy, foundations rooted in such areas as molecular recognition and other non-covalent interactions suggest a host of potential architectures. For example, structural units can be held in precise juxtaposition via rigid control units (Schauer, et al., 1997) that bind branched units via H-bond-based molecular recognition (Newkome, et al., 1996) or, more simplistically, an 'event' (chemical or physical) can be effected via absorption of molecular guests that fill internal void regions and cause branch chain movement. A simple analogy is found in well known polymer swelling. Competition for binding sites and compartments can form the basis for "molecular triggers."

Additionally, a fundamental property of branched macromolecules that is useful for the construction of "next generation" materials is revealed via consideration of the allowed bond rotations (torsions) within these structures (Newkome, et al.). This shows molecular surfaces that are "dynamic" whereby terminal units can at one instant be separated as far as physically possible and in another moment these same units are nearest adjacent neighbors (FIG. 5a). Essentially, movement of terminal groups or units about the surface of the branched superstructure is predicated on simple bond rotations which can be effected by "logical constraints." This dynamic property can be controlled by the use of logical constraints (i.e., site-specific molecular recognition, disruption of internal H-bonding, swelling in void regions, etc.) to facilitate construction of macromolecular assemblies with controllable functional unit positions. In other words, molecules bound to the branches can be selectively rotated into desired positions relative to neighboring molecules having the same ability to rotate or be fixed. This controllable molecular rotation can be constructed throughout a dendrimer thereby providing the aforementioned dynamic property.

In other words, energy is stored in "torsionally constrained" groups. However, energy is also stored within the "guest" metals themselves. Since the metals can be oxidized and reduced, the metals can also store energy. That is, electrons can be removed and added easily. This is done within the otherwise relatively inert framework of the dendrimers skeleton.

Figure 5B:
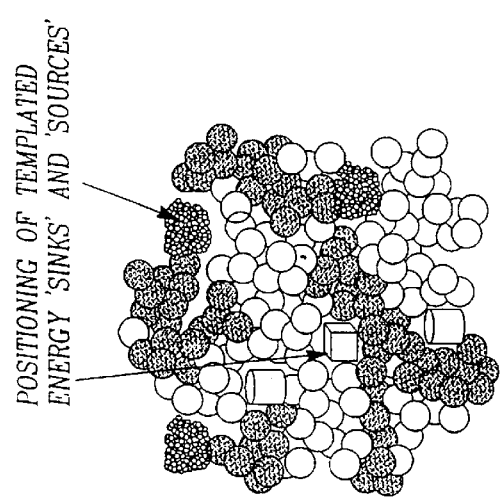
FIG. 5 shows the utility and torsional property of combinatorial-based dendritic construction (a and b) at two dimensional dendritic network (c)
Figure 5B:
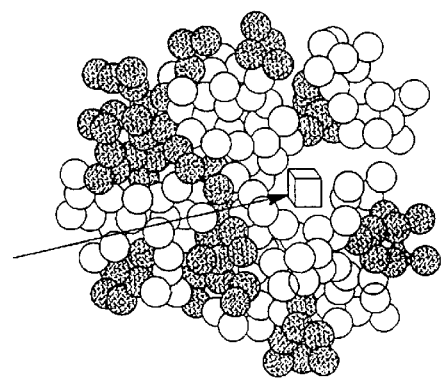
Figure 5B:
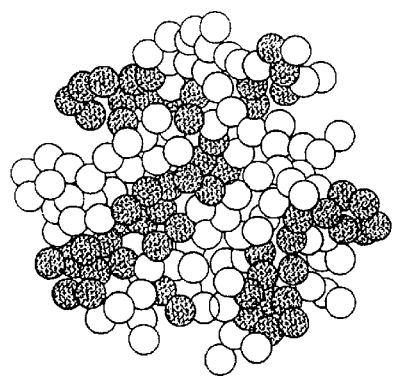
Figure 3H:
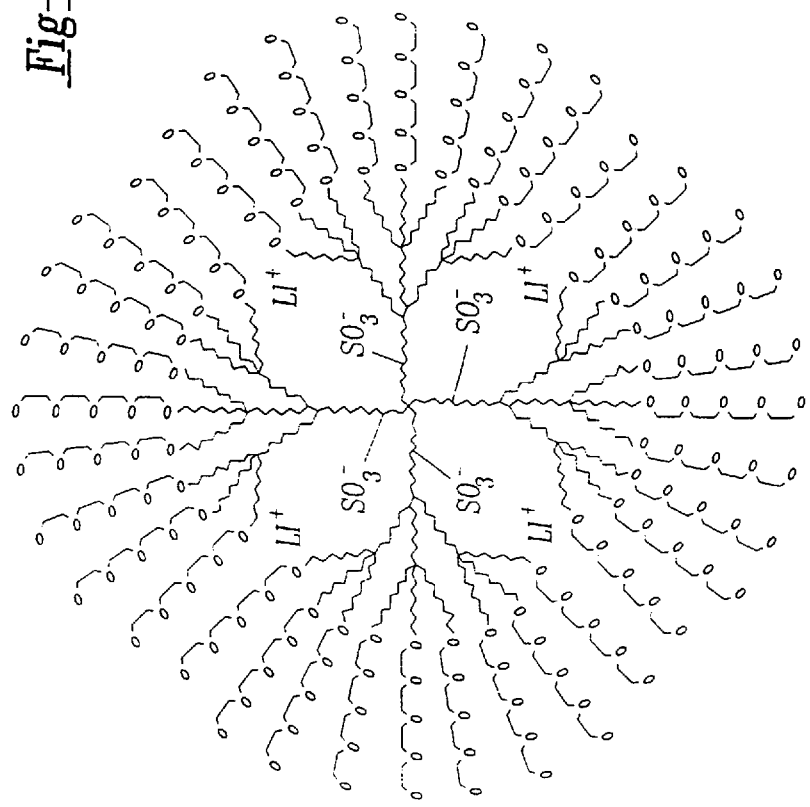
Figure 3E:
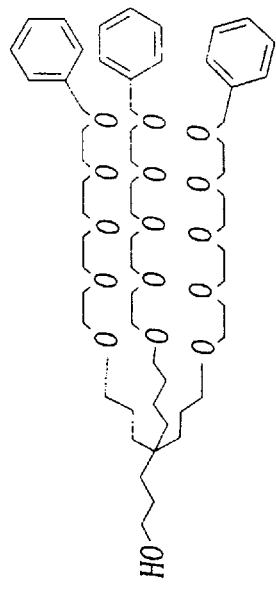
Figure 3F:
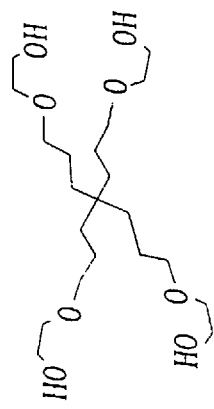
Figure 3G:
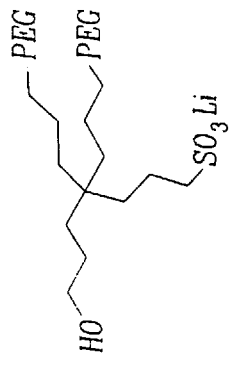
Figure 5C:
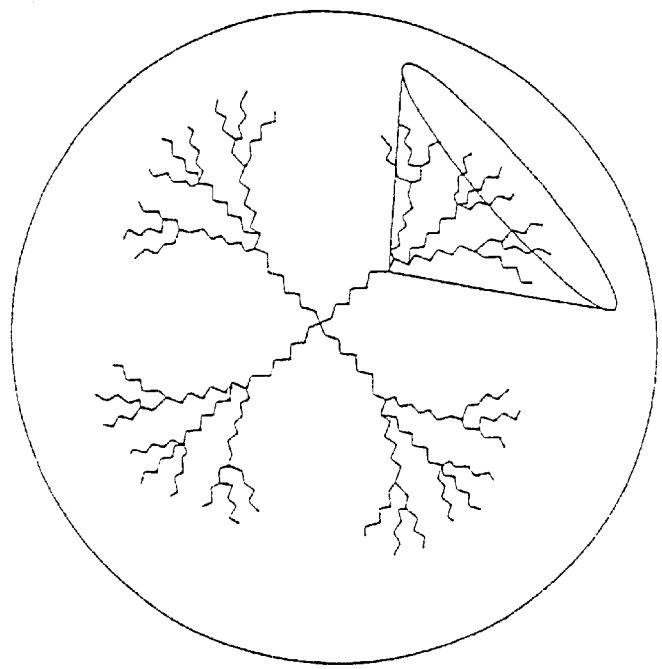
Figure 5C:
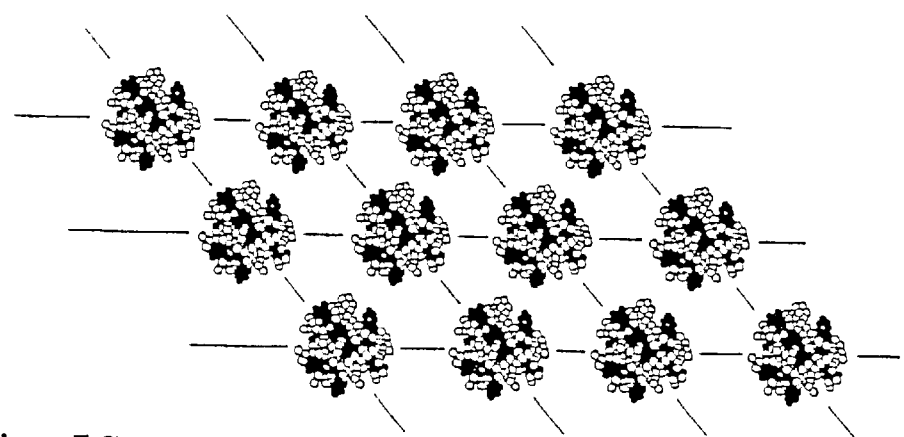
Figure 6B:
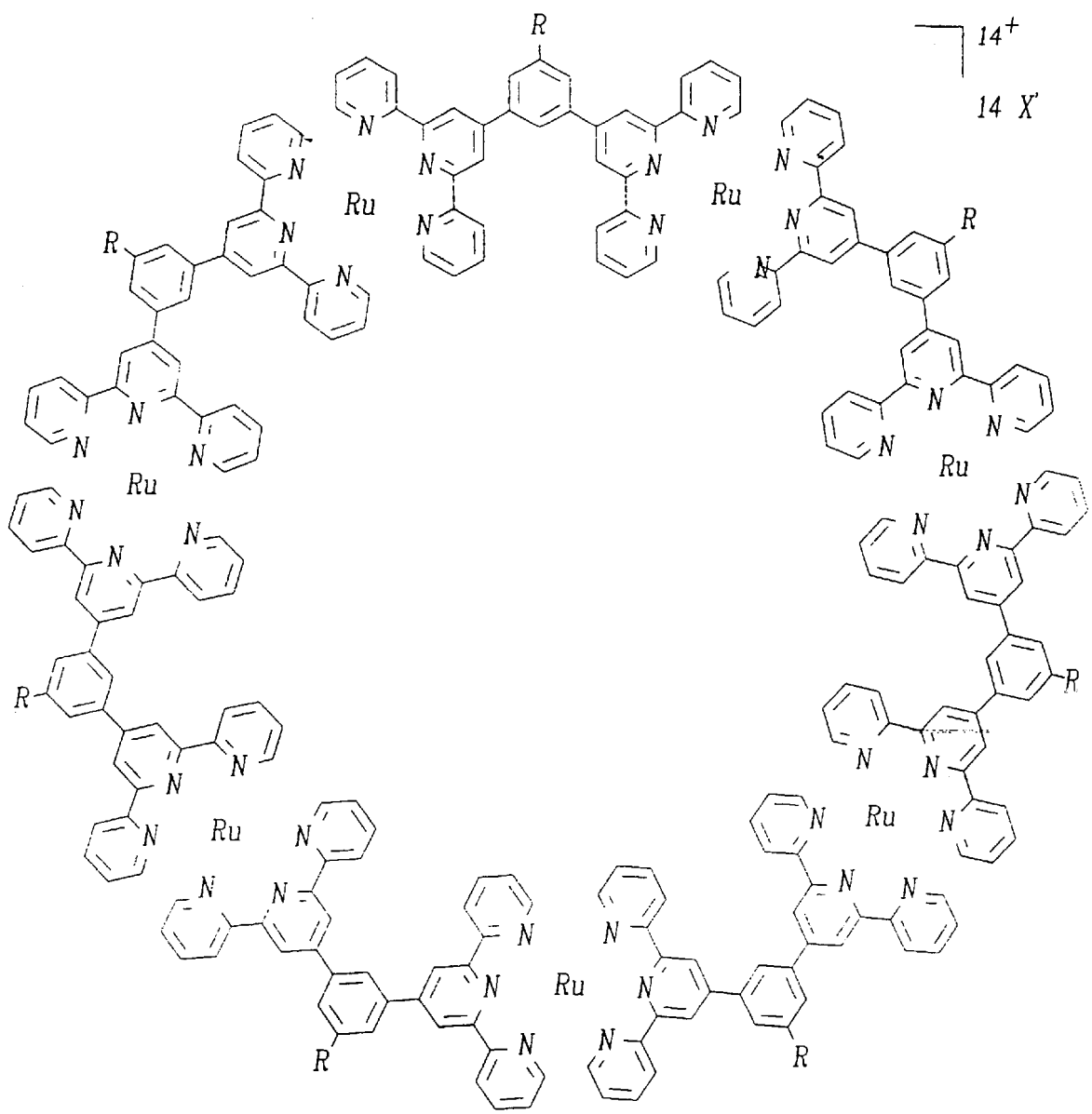
FIG. 6 shows the structures for energy collection and storage.
Figure 6C:
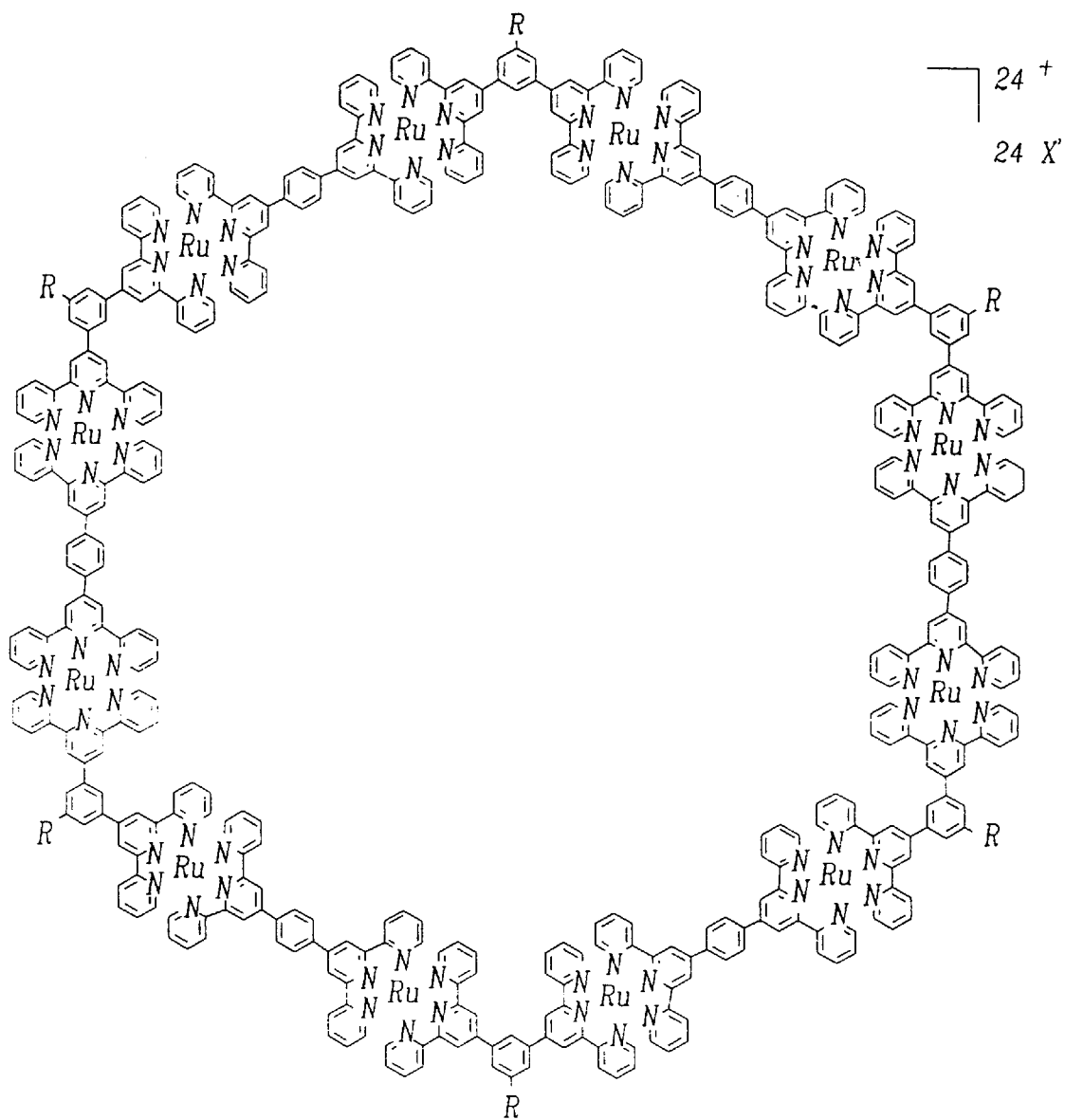

Consideration of "combinatorially" prepared structures (Newkome, et al., 1998) whereby tiers are constructed by using a mixture of equally reactive, complementary monomers. FIG. 5(b) shows three different views of a combinatorially synthesized dendrimer. The left view shows a structure with no included guest where the yellow and red units are allowed to move freely within their respective domains (see FIG. 5a) while the central view shows an included guest which contains two of branch units and essentially 'locks in place' the two lower quadrants of the dendrimer and thus restricts internal and external movement. (Newkome, et al., 1996). A far right view illustrates the potential to encapsulate multiple molecular guest (i.e., the representative cubes and cylinders in FIG. 5b) so as to affect the juxtaposition of attached or adsorbed inorganic composites (e.g., $TiS_2$ and $LiCoO_2$) capable of acting as complementary energy sinks and sources. Due to the advantages of a modular construction approach, these utilitarian architectures are not limited to being prepared individually. FIG. 5c shows a two-dimensional array of combinatorial-based dendrimers envisioned to be constructed simultaneously on a grid (inorganic- or organic-based). (Hanan, et al., 1995; Baxter, et al., 1997; Takami, et al., 1997).

Essentially, any accessible molecular architectures can be used as the polymetallic material. This includes shapes such as hexagonal, square, linear, two dimensional "sheet like", three dimensional, octahedral, and others. Available connectors for building blocks that help to define geometry include, but are not limited to, bipyridal- and terpyridal-based ligands. These ligands can accommodate metals such as Cu, Fe, Ru, Os, Zn, Co, Ni, Mn, Pd, Pt, Rh, Re, W, Ir, Au, and Ag.

EXAMPLES

Example 1

Figure 7:
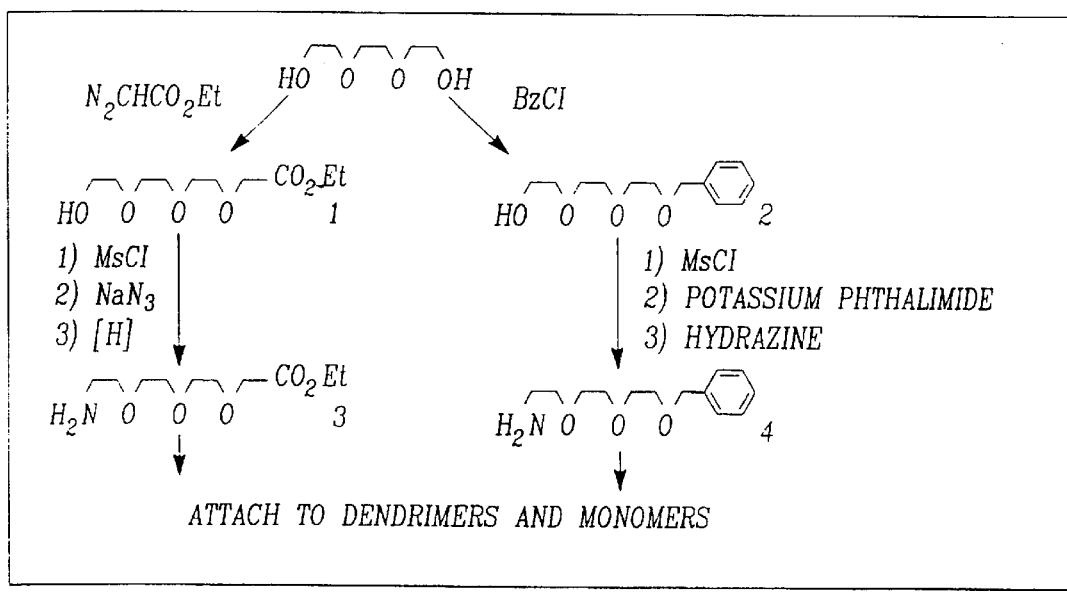
FIG. 7 shows a schematic depicting the preparation of functionalized polyethelane glycol units.
Figure 8A:
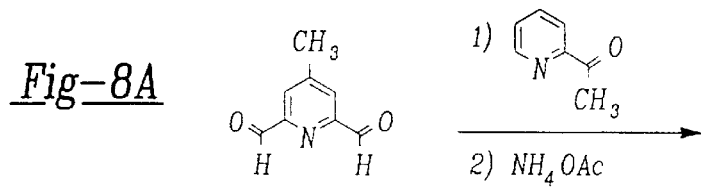
FIG. 8 shows a schematic depicting the directed synthesis of hexa-Ru(II) cluster.
Figure 8B:
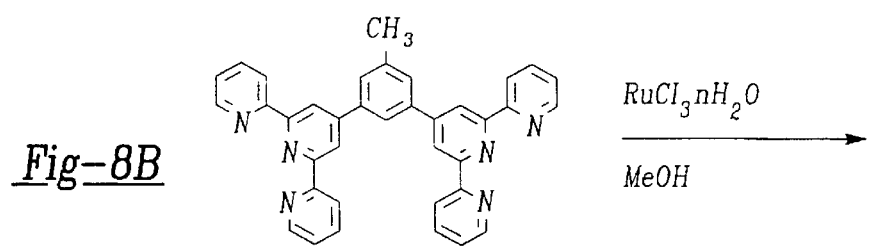
Figure 8C:
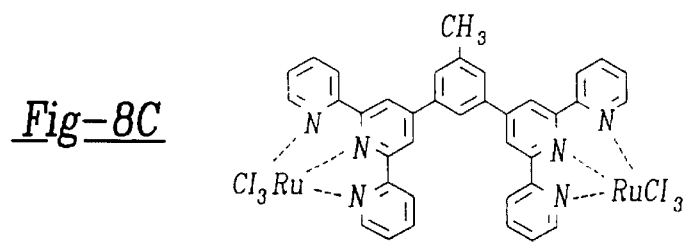
Figure 8D:
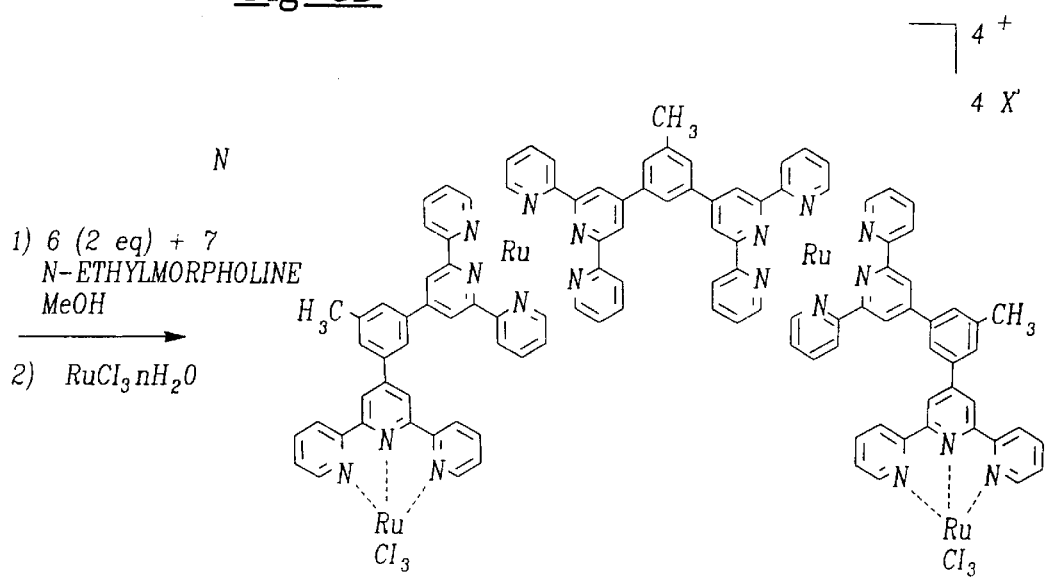
Figure 8E:
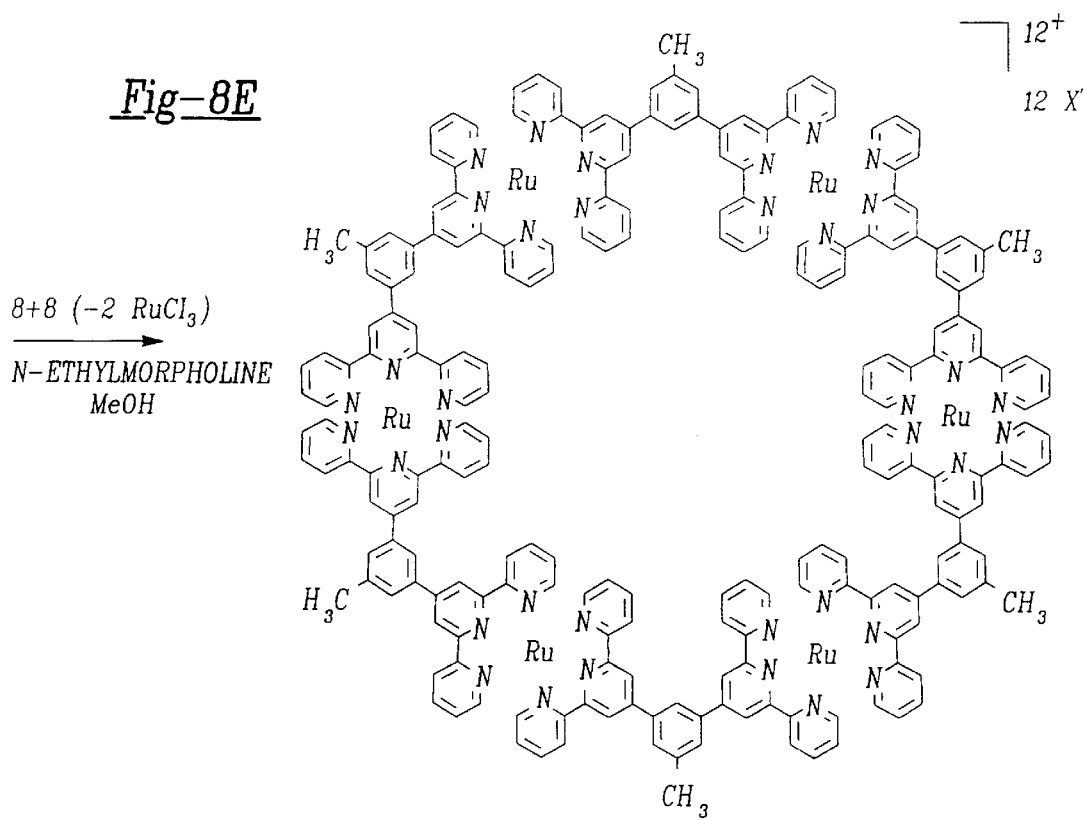

Construction of polyethylene glycol-based building blocks and branched macromolecular architectures are facilitated by the availability of appropriately functionalized polyether fragments. To this end, triethylene glycol units have been prepared possessing terminally modified, complementary reactive and inert moieties (FIG. 7). Triethylene glycol was reacted separately with ethyl diazoacetate and benzyl chloride to afford ester (Newkome, et al., 1996) and benzyl ether (Turner, 1995), respectively. The unaffected hydroxyl group of each monofunctionalized glycol (Newkome, et al., 1996; Turner, 1995) was then converted to the corresponding amine via established procedures. Thus treatment of alcohol (Newkome, et al., 1996) sequentially with mesyl chloride (MsCl) and sodium azide ($NaN_3$) followed by catalytic hydrogenation (Pd—C, $H_2$) yielded amine (Tomalia, et al., 1997). Alcohol (Turner, 1995) was transformed to amine (Grubbs, et al., 1997) by the classical "Gabriel" synthesis after conversion to the mesylate. Incorporation of these modified ethylene glycols, as well as similar homologous materials, into pre-constructed dendritic macromolecules and branched monomers, for the purpose of transforming materials and surfaces into metal storage and transport media, is currently ongoing.

Example 2

As part of efforts to develop nanoscale and molecular-sized energy storage devices, the potential of employing polymetallic architectures for energy collection and concentration was investigated. While the described polymetallic architectures are not initially 'dendritic,' until branching is added, they are constructed via iterative procedures exactly analogous to dendritic is construction (i.e., repetitive procedures performed on similar building blocks). Essentially, the polymetallic architectures that are described can be considered as novel dendritic cores.

Preliminary studies have focused on Ruthenium and the use of terpyridine for ligand connectivity but other metals and ligands are possible. Directed synthesis of these novel materials is illustrated in FIG. 8 whereby a hexaruthenium ring is targeted. Beginning with the known dialdehyde (Young, et al., 1994) the primary bisterpyridine building block (Newkome, et al., 1998) was crafted via treatment with 2-acetylpyridine followed by reaction with $NH_4OAc$. BisRu(III) adduct (Lipkowski, et al., 1994) was then generated by the addition of $RuCl_3.nH_2O$. Treatment of paramagnetic complex (Lipkowski, et al., 1994) with two equivalents of bisterpyridine (Newkome, et al., 1998), under reducing conditions (N-ethylmorpholine, MeOH), and subsequent addition of $RuCl_3.nH_2O$ gave the bisterpyridine trimer (Owen, 1997). Complexation of the trimer (Owen, 1997) with one equivalent of its diamagnetic precusor (i.e., (Owen, 1997) minus 2 $RuCl_3$) afforded the paramagnetic 6-membered ring (Bykov, et al., 1994) comprised of 6 $Ru^{2+}$ metal ions and 12 confining terpyridyl moieties. Each terpyridyl-Ru-terpyridyl unit possesses pseudooctahedral geometry and the terminal methyl groups are juxtaposed in a nearly planar arrangement. Characterization of the dodecacation (Bykov, et al., 1994) thus far includes $^1H$ and $^{13}C$ NMR as well as MALDI-TOF MS.

It is notable that a hexa-metallo ring (Bykov, et al., 1994) can also be accessed by a simple, one step, self-assembly of bisterpyridine (Newkome, et al., 1998) and six equivalents of $RuCl_3.nH_2O$ in the presence of N-ethylmorpholine.

Hence, by employing directed and self-assembly synthetic techniques, the construction of smaller as well as larger cyclic structures continue to be investigated (i.e., Newkome, et al., 1991; Newkome, et al., 1992; Newkome, et al., 1991; FIG. 1) is investigated. Derivatization of the peripheral methyl moieties with rigid and flexible appendages is possible to facilitate "network" positioning of the poly-metal centers. For example, the branch modified structure (Newkome, et al., 1996), which can be easily accessed via attachment of known, pre-formed polyphenylacetylene dendrons, possesses structural requirements known to promote columnar mesophase formation (i.e., near planarity and lipophilic arms positioned in a symmetrical cyclic array). Further, the phenylacetylene dendritic arms are able to act as "molecular antennas," as reported in the literature, for energy direction and concentration towards the electron-poor poly-metallo energy sinks.

Counter ions for the transition metal complexes can be easily changed to facilitate stability and organized characteristics such as found in two-dimensional and three dimensional ordered networks. Such counter ions include, but are not limited to, CI, Br, I, $(PF_6)^-$, and dendrimer-based polyions. An example of such a polyion is $C(CH_2OCH_2CH_2CONHC(CH_2CH_2CO_2K^+)_3)_4$.

In conclusion, the iterative synthetic method combined with fundamental properties of dendritic macromolecules and a modular set of building blocks allow the realization of new materials to promote advances in a broad spectrum of molecular electronics. Creation of molecules with the capacity to take advantage of multiple environmental interactions at multiple sites within the superstructure should provide vast opportunity for the development polyfunctional (polyunit) materials designed for energy storage, release, and conduction.

Throughout this application, various publications, including United States patents, are referenced by author and year and patents by number. Full citations for the publications are listed below. The disclosures of these publications and patents in their entireties are hereby incorporated by reference into this application in order to more fully describe the state of the art to which this invention pertains.

Other modifications to the invention can be made, such as specifically constructed metallodendrimers and cyclic metal arrays. These can be used in, or incorporated into, magneto resistive and giant magneto resistive disk drive heads to improve the performance of byte reading and detection based on electron flow pathway dispersion. The result is increased resistance, thus enhancing detection.

The invention has been described in an illustrative manner, and it is to be understood that the terminology which has been used is intended to be in the nature of words of description rather than of limitation.

Obviously, many modifications and variations of the present invention are possible in light of the above teachings. It is, therefore, to be understood that within the scope of the appended claims, the invention may be practiced otherwise than as specifically described.

REFERENCES (1) Newkome, G. R.; Moorefield, C. N.; Vögtle, F. *Dendritic Molecules: Concepts, Syntheses, Perspective*; VCH: Weinheim, Germany, 1996.
(2) Turner, S. R. *Polym. Mater. Sci. Eng.* 1995, 73, 77–78.
(3) Tomalia, D. A.; Esfand, R. *Chem. Ind.* (London) 1997, 416–420.
(4) Grubbs, R. B.,; Hawker, C. J.; Dao, J.; Fréchet, J. M., *J. Angew. Chem., Int. Ed. Engl.* 1997, 36, 270–272.
(5) Young, J. K.; Baker, G. R.; Newkome, G. R.; Morris, K. F.; Johnson, C. S., Jr. *Macromolecules* 1994, 27, 3464–3471.
(6) Newkome, G. R.; Weis, C. D.; Moorefield, C. N.; Baker, G. R.; Childs, B. J.; Epperson, J. D. *Angew. Chem.* 1998, 37, 307–310.
(7) Lipkowski, J.; Ross, P. N. *Electrochemistry of Novel Materials*; VCH: New York, 1994, Chapters 2 and 3
(8) Owen, J. R. *Chem. Soc. Rev.* 1997, 26, 259–267.
(9) Bykov, V. A.; Emelynov, A. V.; Poltoratsky, W. A.; Samsonov, N. S. *Industrial Microelectronics*, 1994.
(10) Newkome, G. R.; Moorefield, C. N.; Baker, G. R.; Johnson, A. L.; Behera, R. K. *Angew Chem., Int. Ed. Engl.* 1991, 30, 1176–1178.
(11) Newkome, G. R.; Moorefield, C. N. "Unimolecular micelles and method of making the same" U.S. Pat. No. 5,154,853, 1992.
(12) Newkome, G. R.; Moorefield, C. N.; Baker, G. R.; Saunders, M. J.; Grossman, S. H. *Angew. Chem., Int. Ed. Engl.* 1991, 30, 1178–1180.
(13) Newkome, G. R.; Woosley, B. D.; He, E.; Moorefield, C. N. Güther, R.; Baker, G. R.; Escamilla, G. H.; Merrill, J.; Luftmann, H. *Chem. Commun.* 1996, 2737–2738.
(14) Newkome, G. R.; Güther, R.; Moorefield, C. N.; Cardullo, F.; Echegoyen, L.; Perez-Cordero, E.; Luftmann, H. *Angew. Chem., Int. Ed. Engl.* 1995, 34, 2023–2026.
(15) Newkome, G. R.; Cardullo, F.; Constable, E. C.; Moorefield, C. N.; Cargill Thompson, A. M. W. *J. Chem. Soc., Chem. Commun.*, 1993, 925–927.
(16) Newkome, G. R.; He, E. *Angew. Chem., Int. Ed. Engl.* 1997, submitted.
(17) Newkome, G. R.; Narayanan, V. V.; Echegoyen, L.; Perez-Cordero, E.; Luftmann, H. *Macromolecules* 1997, 30, 5187–5191.
(18) Newkome, G. R.; Weis, C. D.; Moorefield, C. N.; Fronczek, F. R. *Tetrahedron Lett.* 1997, 38, 7053–7056.
(19) Newkome, G. R.; Weis, C. D.; Childs, B. J. *Designed Monomers and Polymers* 1997, 1, in press.
(20) Craven, J. R.; Mobbs, R. H.; Booth, C.; Giles, J. R. M. Makromol. Chem., Rapid Commun. 1986, 7, 81.
(21) Craven, J. R.; Nicolas, C. V.; Webster, R.; Wilson, J. D.; Mobbs, R. H.; Morris, G. A.; Heatley, F.; Booth, C.; Giles, J. R. M. *Br. Polym. J.* 1987, 1987, 509.
(22) Schauer, C. L.; Matwey, E.; Fowler, F. W.; Lauker, J. W. *J. Am. Chem. Soc.* 1997, 119, 10254.
(23) Newkome, G. R.; Moorefield, C. N., unpublished results.
(24) Hanan, G. S.; Arana, C. R.; Lehn, J. -M.; Fenske, D. *Angew. Chem., Int. Ed. Engl.* 1995, 34, 1122–1124.
(25) Baxter, P. N. W.; Lehn, J. -M.; Kneisel, B. O.; Fenske, D.
Chem. Commun. 1997, 2231–2232.
(26) Takami, T.; Ozaki, H.; Kasuga, M.; Tsuchiya, T.; Mazaki, Y.; Fukushi, D.; Ogawa, A.; Uda, M.; Aono, M. *Angew. Chem., Int. Ed. Engl.*, 1997, 36, 2755.

What is claimed is:

1. Dendritic materials for enhanced performance of an energy storage device, comprising a unimolecular micelle electrolyte including branched building blocks capable of triggered electrochemical discharge.

2. The dendritic materials according to claim 1, wherein said branched building blocks include polyethylene glycol functionalized, highly saturated branches.

3. The dendritic materials according to claim 1, wherein said dendritic materials have improved electrolyte stability.

4. The dendritic materials according to claim 1, wherein said dendritic materials have more efficient Lithium-ion transport.

5. The dendritic materials according to claim 1, wherein said dendritic materials have a decreased electrolyte layer thickness.

6. The dendritic materials according to claim 5, wherein said dendritic materials have greater specific energy, energy density, and battery cycle life.

7. The dendritic materials according to claim 1, wherein said dendritic materials further include linearly positioned neuromolecular arrays.

8. The dendritic materials according to claim 7, wherein said dendritic materials are grown on polyalkyn-based molecular wires.

9. The dendritic materials according to claim 1, wherein said unimolecular micelles further include logical constraints for controlling dynamic movement.

10. The dendritic materials according to claim 9, wherein said dynamic movement is torsional for allowing terminal units to be either adjacent or separated dependent upon the torsional movement.

11. The dendritic material according to claim 9, wherein said dyanmic movement is controlled by a guest molecule.

12. The dendritic material according to claim 11 wherein said dendritic material includes lipophilic centers, said guest being disposed within said lipophilic centers.

13. The dendritic material according to claim 12 wherein said guest is a counter ion selected from the group consisting essentially of Cl, Br$^-$, I$^-$, (PF$_6$)$^-$ and dendrimer-based polyions.

14. The dendritic material according to claim 13 wherein said polyion is C(CH$_2$OCH$_2$CH$_2$CONHC(CH$_2$CH$_2$CO$_2^-$ K$^+$)$_3$)$_4$).

15. The dendritic material according to claim 9, wherein said logical constraints include at least one from the group consisting of site-specific molecular recognition, disruption of internal H-bonding and swelling in void regions.

16. The dendritic materials according to claim 1, wherein said dendritic materials made polymetallic regions.

17. The dendritic material according to claim 16 wherein the polymetallic material is selected from the group consisting essentially of hexagonal, square, linear, sheet-like, three dimensional and octahedral shapes.

18. The dendritic material according to claim 17 including connectors that assist in defining geometry, said connections selected from the group consisting of bipyridal- and terpyridal-based ligands.

19. The dendritic material according to claim 16 wherein said ligands accommodate metals selected from the group consisting of Cu, Fe, Ru, Os, Zn, Co, Ni, Mn, Pd, Pt, Rh, Re, W, In, Au, and Ag.

20. An energy storage device comprising:
a lithium source;
a hydrocarbon dendrimer-based electrolyte of claim 1;
an insertion electrode; and
a current conductor.

21. A method of controlling dynamic movement of a dendrimer by inserting a guest into the dendrimer.

22. A method of improving magneto resistive and giant magneto resistive disk drive heads by:
incorporating metallodendrimers and cyclic metal arrays into magneto resistive and giant metallo resistive disk drive heads and increasing resistance and enhancing signal detection of the heads to improve performance of byte reading and detection based on electron flow pathway dispersion.

* * * * *